Dec. 9, 1958     R. L. EMERY     2,863,595
MOLDED PULP PACKAGING MEMBERS
Filed Nov. 23, 1953     10 Sheets—Sheet 3

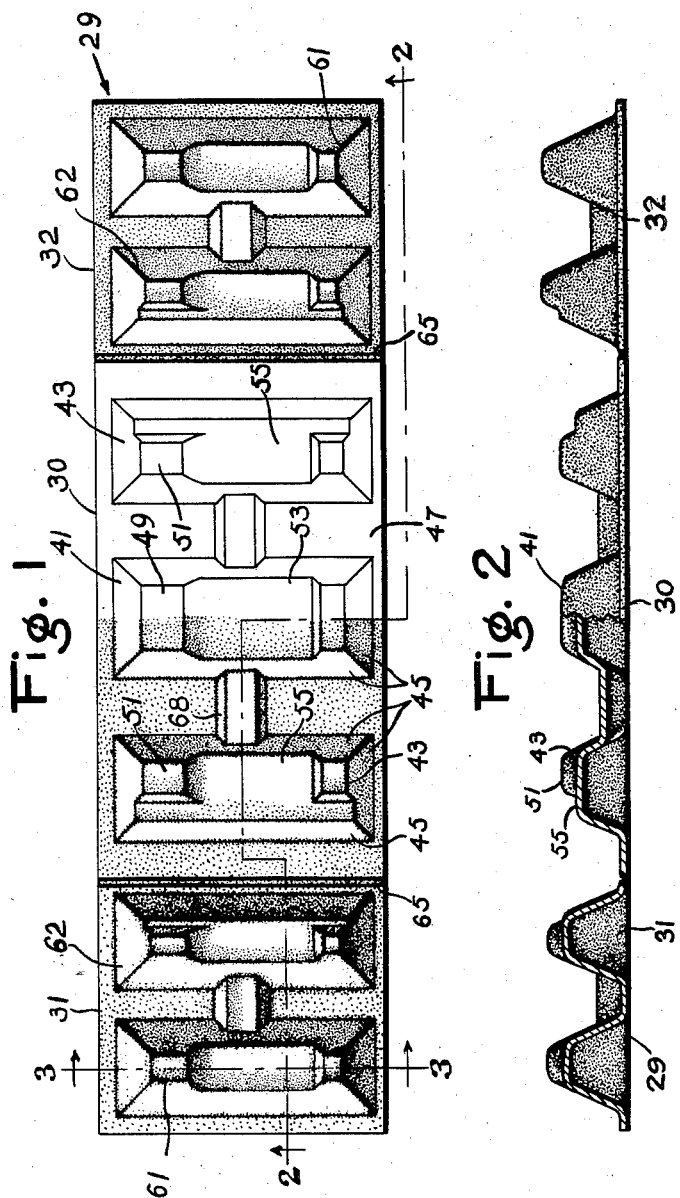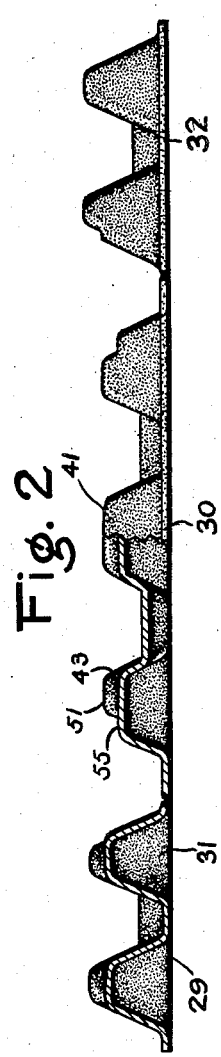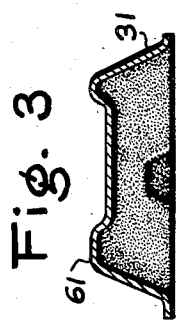

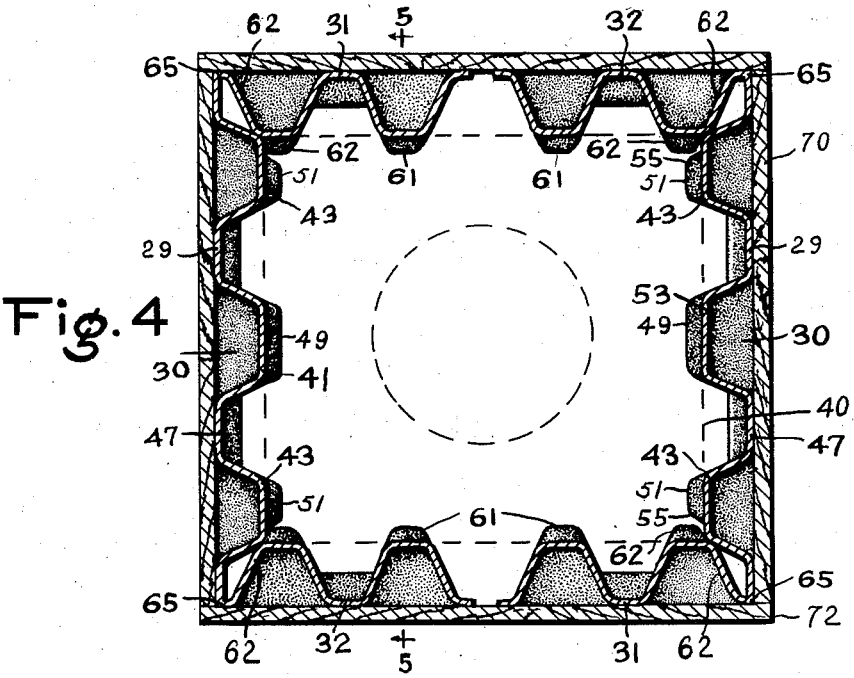
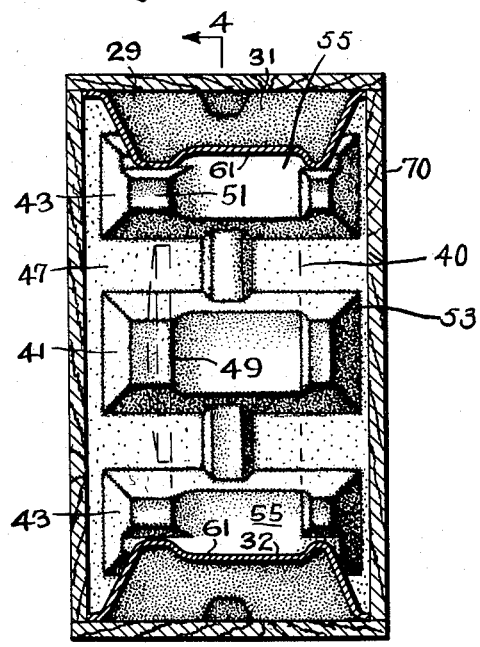

*INVENTOR.*
RICHARD L. EMERY
BY
HIS ATTORNEYS

Dec. 9, 1958 R. L. EMERY 2,863,595
MOLDED PULP PACKAGING MEMBERS
Filed Nov. 23, 1953 10 Sheets-Sheet 4

INVENTOR.
RICHARD L. EMERY
BY
HIS ATTORNEYS

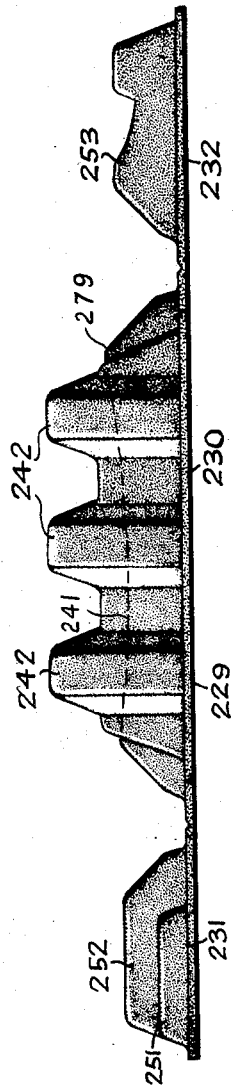
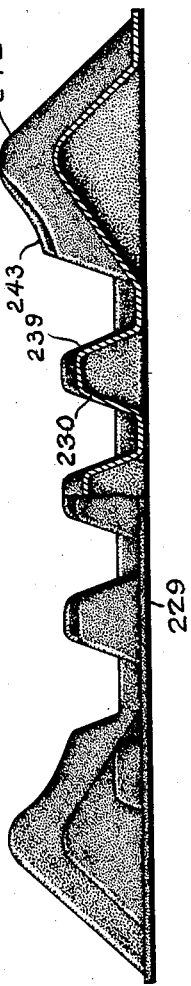

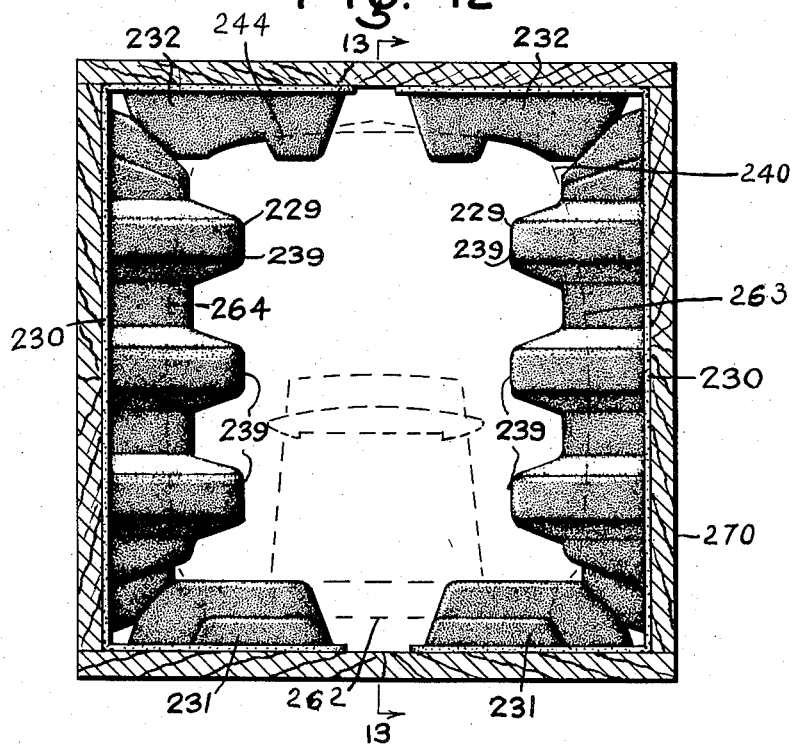

Dec. 9, 1958  R. L. EMERY  2,863,595
MOLDED PULP PACKAGING MEMBERS
Filed Nov. 23, 1953  10 Sheets-Sheet 7
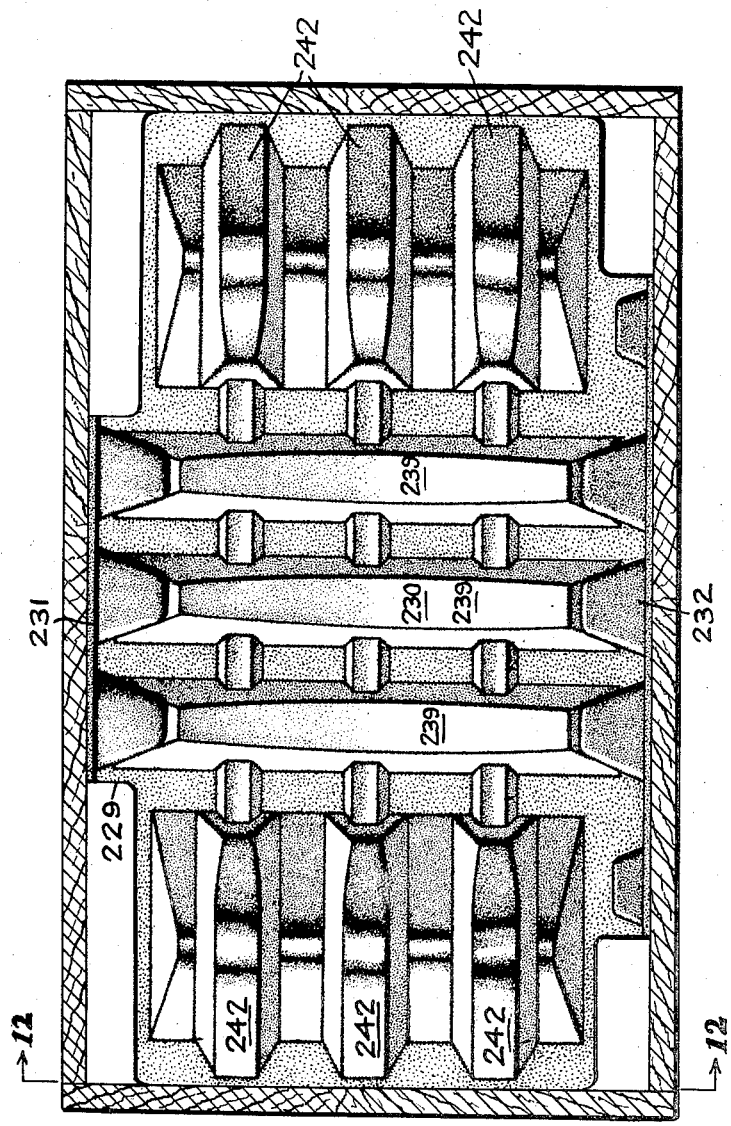
INVENTOR.
RICHARD L. EMERY
BY
HIS ATTORNEYS Dec. 9, 1958   R. L. EMERY   2,863,595
MOLDED PULP PACKAGING MEMBERS
Filed Nov. 23, 1953   10 Sheets-Sheet 8

INVENTOR.
RICHARD L. EMERY
BY
*Connolly and Hutz*
HIS ATTORNEYS

Dec. 9, 1958  R. L. EMERY  2,863,595
MOLDED PULP PACKAGING MEMBERS
Filed Nov. 23, 1953  10 Sheets-Sheet 9

INVENTOR.
RICHARD L. EMERY
BY
HIS ATTORNEYS

Dec. 9, 1958   R. L. EMERY   2,863,595
MOLDED PULP PACKAGING MEMBERS
Filed Nov. 23, 1953   10 Sheets-Sheet 10
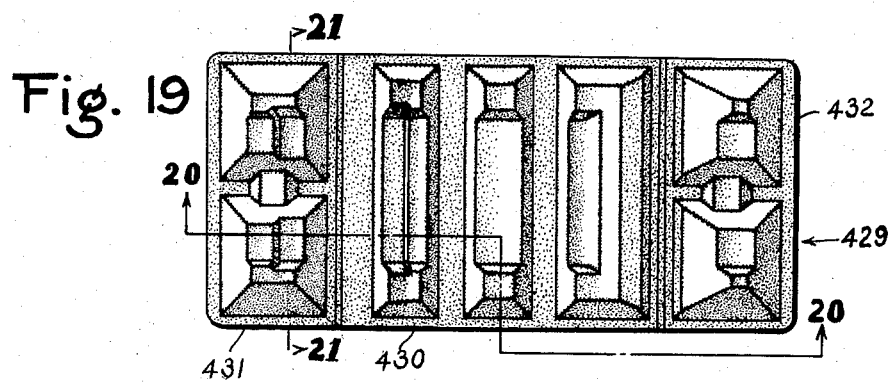
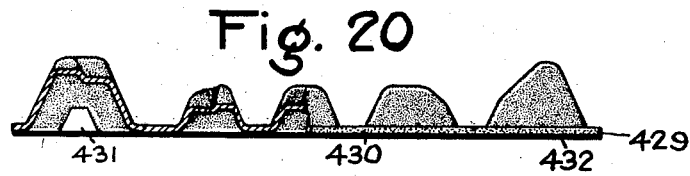
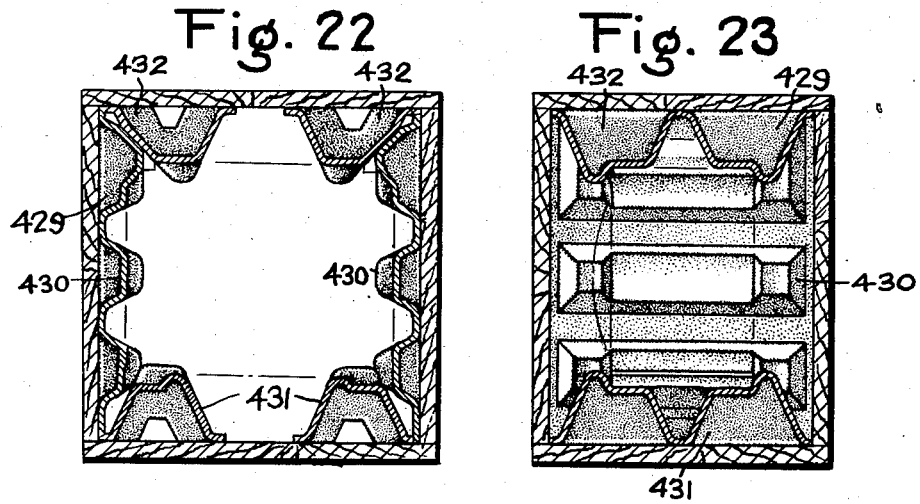
INVENTOR.
RICHARD L. EMERY
BY
HIS ATTORNEYS United States Patent Office 2,863,595
Patented Dec. 9, 1958

2,863,595

MOLDED PULP PACKAGING MEMBERS

Richard L. Emery, Fairfield, Maine, assignor to Keyes Fibre Company, Portland, Maine, a corporation of Maine Application November 23, 1953, Serial No. 393,670

3 Claims. (Cl. 229—2.5)

This invention relates to the packaging of bulky articles, particularly such articles that have substantial length, width and height, and are individually packaged.

Among the objects of the present invention is the provision of novel molded pulp packaging pads or cushions that enable effective but simplified packing.

The above, as well as additional objects of the present invention will be more clearly understood from the following description of several of its exemplifications reference being made to the accompanying drawings wherein:

Fig. 1 is a plan view of a packaging pad or cushion according to the present invention;

Fig. 2 is a front view of the pad of Fig. 1 partly in section, as indicated by line 2—2;

Fig. 3 is a sectional view of the pad of Fig. 1 along the line 3—3;

Fig. 4 is a sectional view along line 4—4 of Fig. 5 showing a package made with the pad of Fig. 1;

Fig. 5 is a sectional view along the line 5—5 of Fig. 4;

Fig. 10 is a side view of the pad of Fig. 9 looking at it from its right side;

Fig. 11 is a front view partly in section along the line 11—11 of the construction of Fig. 9;

Fig. 12 is a partly sectional side view of a package made with the pad of Fig. 9, the view being taken along the line 12—12 of Fig. 13;

Fig. 13 is a sectional view of the construction of Fig. 12 taken along the line 13—13;

Figure 14:
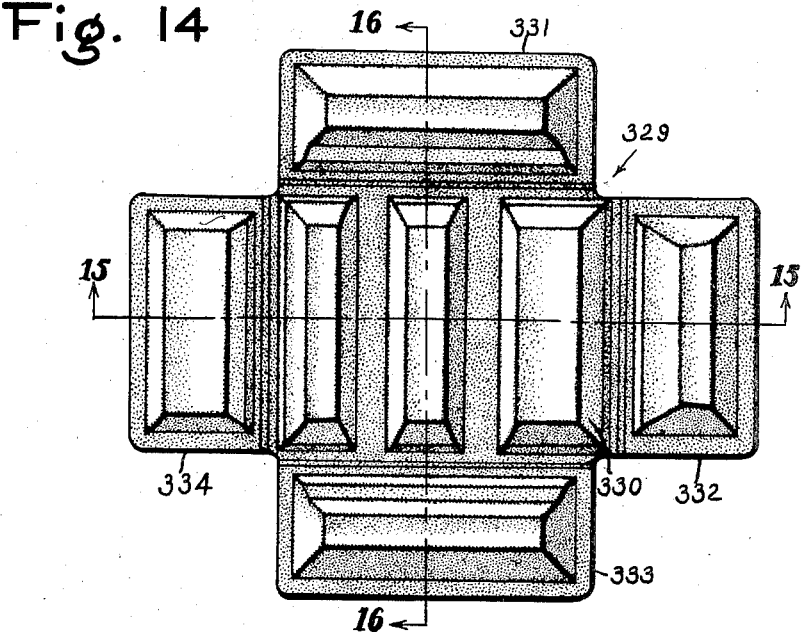
Fig. 14 is a plan view of a further packaging cushion construction typifying the present invention.
Figure 15:
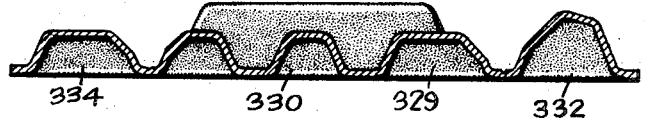
Figure 16:
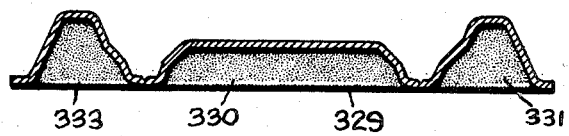
Figure 17:
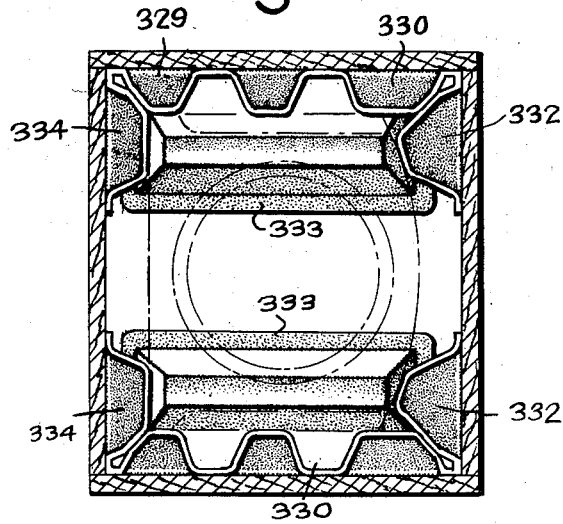
Figure 18:
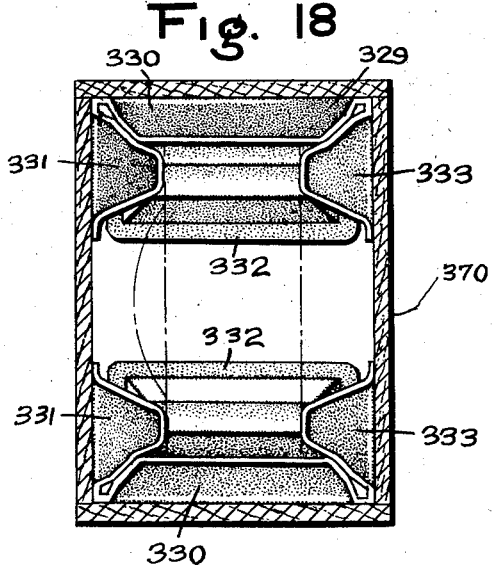

Figs. 15 and 16 are sectional views along the lines 15—15 and 16—16 respectively of the cushion of Fig. 14;

Figs. 17 and 18 are views similar to Figs. 4 and 5 showing a package made with the cushion of Fig. 14; and Figs. 19, 20, 21, 22 and 23 are views similar to Figs. 1 to 5 inclusive showing another form of packaging pad construction of the present invention.

According to the present invention a very convenient-to-use molded pulp packaging cushion or pad is provided for individually packaging bulky articles of substantial length, width and height. The cushion has a first ribbed panel with one surface shaped to engage one face of the article, and additional ribbed panels hinged to opposite sides of said first panel with surfaces shaped to engage adjacent faces of the article, the engagement surface of the first panel being shaped to extend intermediate the hinged panels beyond said one face and to also engage at least the marginal portions of other adjacent faces of the article.

Referring to the drawings, the packaging cushion 29 of Fig. 1 has a central panel 30 of relatively extended length, with side panels 31, 32 hinged to opposite sides of the center panel. Each of the panels has ribs shaped to suitably engage adjacent faces of the article to be packaged.

The ribs shown in Fig. 1 are suitable for engaging the faces of a generally rectangular article such as a clock, represented by the dash lines 40 in Figs. 4 and 5. To this end the center panel 30 has a central rib 41 extending transversely across the panel just short of its margins, and additional ribs 43, 43 at each end. All the ribs 41, 43, 43 include tapering walls that rise from a generally flat sheet-like body 47 of the packaging cushion to upper surfaces 49, 51. These upper surfaces are in turn depressed intermediate the length of the ribs, as indicated at 53, 55 to provide a pocket for receiving the face of the clock that is to be engaged and cushioned from the body 47 by the ribs.

In this way, the upper surfaces 49, 51 form post or lug-like extensions that project beyond the face of the clock engaged in recesses 53, 55, and extend far enough to engage the marginal portions of the front and back faces of the clock.

Side panels 31, 32 are also shown as correspondingly provided with ribs 61, 62 generally similar to ribs 41, 43 with upper surfaces correspondingly depressed. The length of the center panel can be made to approximate or be somewhat longer than the length of the face to be engaged by it. At each end of this panel scoring 65 can be provided to simplify the folding of the side panels with respect to the center panel.

Fig. 4 shows two packaging cushions 29 folded around a clock 40 and enclosed in a container such as a box 70. It will be noted that the posts or lugs 49, 51 of the center panels as well as the corresponding posts or lugs of the side panels extend around the peripheral margins of the clock. As indicated in Fig. 5, the clock will accordingly be supported entirely by the recessed upper surfaces 53, 55 of the ribs, and by the posts on either side of these recesses. The clock will, therefore, be securely packaged and at the same time fully cushioned with respect to the walls of the box against which the pads are placed as well as against the remaining front and back walls. No other or supplemental cushioning is needed. The cushioning is so effective that the box 70 can be made of cardboard or similar material and still provide a very satisfactory package.

The particular shaping of the individual ribs, as well as the number of ribs that are used in any of the panels can be subject to considerable variation. Thus, the ribs can be straight as shown in Figs. 1 to 5 inclusive, or they can be curved or even circular, triangular, etc., in plan view. If desired, one rib can be used in any one or more of the panels, and this rib can be restricted to a small portion of the center of the panel. Alternatively, two, four, five, or more ribs can be used in place of the three shown in the figures. In fact, a single rib can be made to extend practically completely along the length of the center and/or side panels. However, where ribs of relatively extended area are used, it is desirable to stiffen the extended walls of such ribs as by providing them with convolutions such as channels or corrugations that are also of rib-like form. The packaging cushion or any of its panels can be stiffened if desired by the further addition of reenforcing ribs 68 which can conveniently connect the cushioning ribs, as shown in the above figures.

A feature of the present invention is the improved cushioning at the hinged corners of the pad that can be provided by shaping the adjacent ribs on opposite sides of the hinges so that the ribs abut each other in the folded or packaged position. As shown in Fig. 4, ribs 51 and 62 are shaped in this manner, and as a result the packaging is extremely resistant to shocks such as that produced by dropping the packaged box on its corner 72. Without the abutting relationship, such shocks tend to wedge the corner of the clock between the corner ribs, thereby deforming the ribs and loosening the packing. The clock will then be poorly cushioned, particularly at the wedged corner, and readily damaged.

The packaging pad of Figs. 1 to 5 inclusive is readily manufactured by molded pulp techniques from a slurry of pulp fibres. The specific details of such manufacture form no part of the present invention, but reference can be made to U. S. Patents Nos. 2,585,049 and 2,192,937 for disclosures as to suitable manufacturing techniques.

Figure 6:
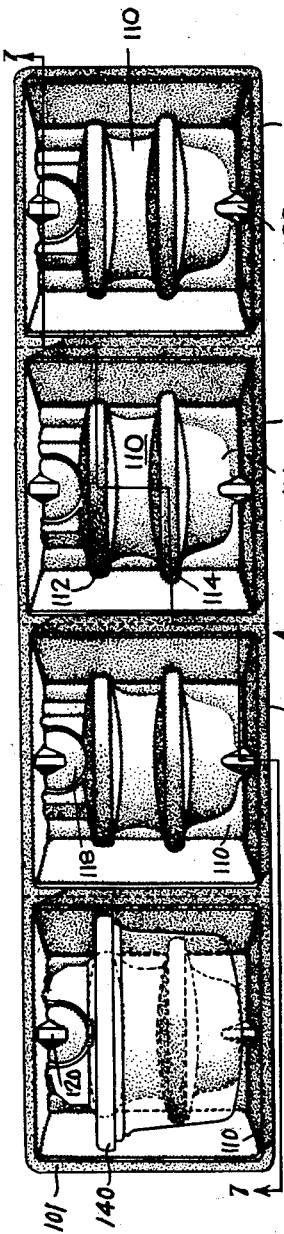
Fig. 6 is a plan view of a modified form of unfolded packaging pad or cushion illustrative of the present invention, an article to be packed by this pad being shown in position on one of its panels.
Figure 7:
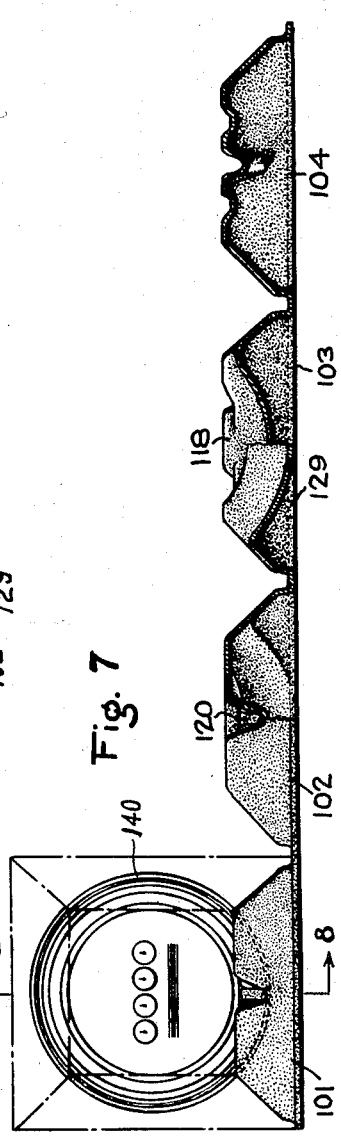
Fig. 7 is a front view partly in section along the line 7—7 of the construction of Fig. 6, also showing in phantom the folded configuration of the pad.
Figure 8:
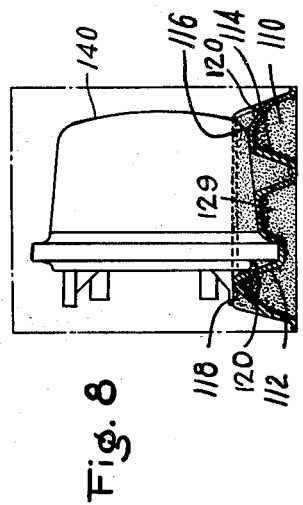
Fig. 8 is a sectional view of Fig. 7 taken along the line 8—8.

Figs. 6, 7 and 8 show a particularly desirable form of the present invention. In this construction a cushioning pad 129 has a number of panels so arranged that they can be folded entirely around the article to be packaged. The embodiment shown has four panels 101, 102, 103 and 104, each of identical configuration, and shaped so as to cushion a generally cylindrical article such as an electric power meter 140.

As shown more clearly in Fig. 8 the individual panels each have one relatively large rib 110 and extending lengthwise of the rib, channels 112 and 114. The top of the rib also contains a depression 116 which forms a seat for contacting the periphery of the meter. This seat can also be arranged to have one or more bosses 118 to snugly receive and cushion projecting portions of the meter. Strengthening ribs 120 can be provided along the side walls of the main ribs 110, but adequate cushioning protection is obtained without them. In fact, with some manufacturing techniques better results are obtained by omitting ribs 120. As in the construction of Figs. 1 to 5 inclusive the ribs 110 are arranged to abut each other when the pad is folded in the manner shown in phantom in Fig. 7. One or both of the channels 112, 114 can be arranged to receive a flange or other sections of the meter which project out radially from its body portion. Such a projection-receiving channel is preferably elevated above the floor of its panel so as to properly cushion the projecting elements from the box or other materials with which the meter cushion comes into contact.

In use the meter can be deposited on one of the panels of the pad as shown in Fig. 6 and the remaining panels of the pad folded around the meter. The combination can then be inserted in individual boxes or crates, or packed together with other cushioned meters in a large crate. By reason of the encircling characteristics of the cushion, as well as the anchoring characteristics of the depressed portions 116 of the ribs, the meter is firmly held in place and properly cushioned.

Figure 9:
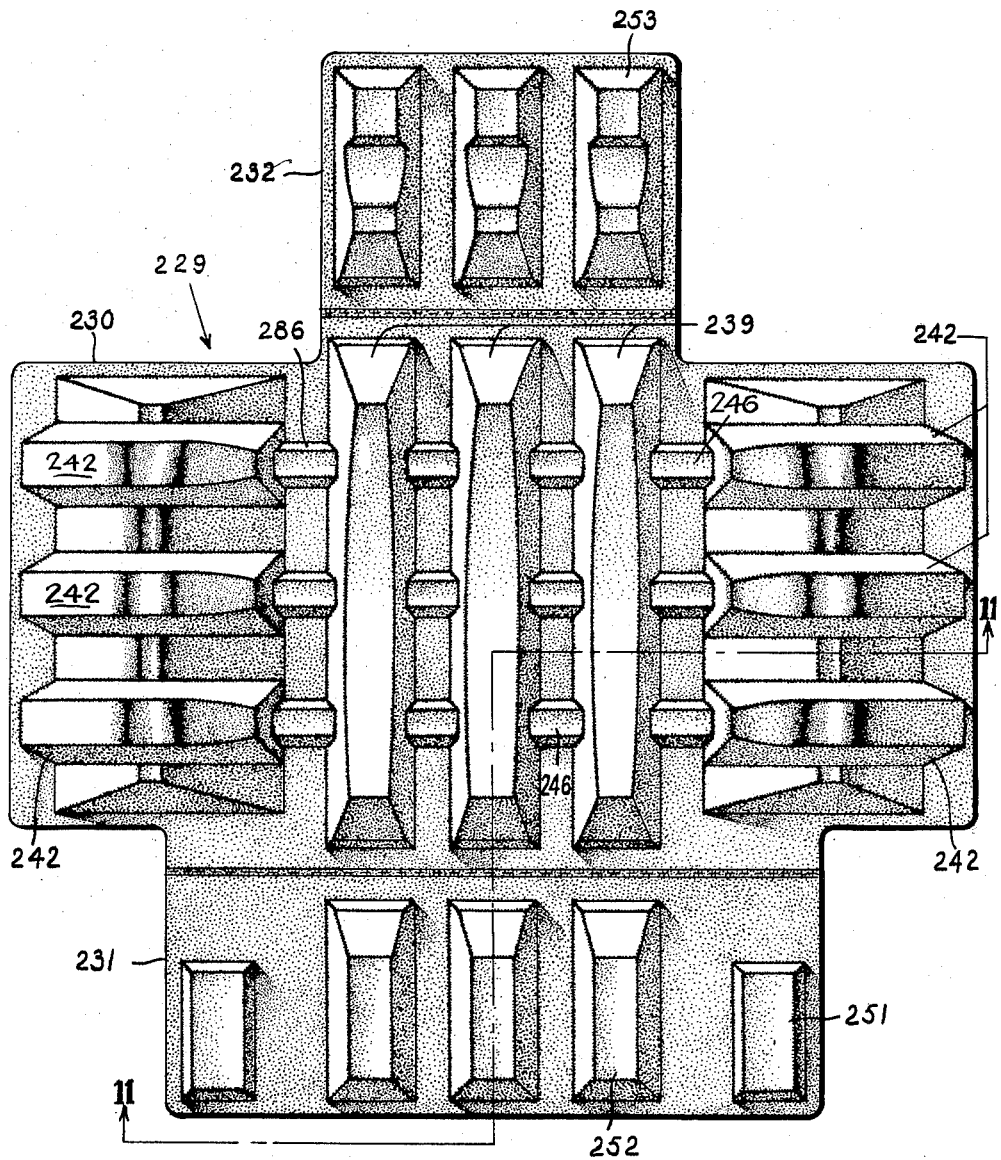
Fig. 9 is a plan view of another type of packing pad or cushion incorporating the present invention.

Figs. 9 to 13 inclusive show a different form of packaging arrangement in which a cushioning pad is generally similar to the cushioning pad of Figs. 1 to 5 inclusive but has its end panels of shortened width. The pad itself is shown in Figs. 9, 10 and 11 at 229 as having a principal or central panel 230 to opposite ends of which are hinged relatively short panels 231, 232.

The panel 230 has three sets of cushioning ribs, a central set including the three ribs 239 extending between the hinged ends, and a pair of side rib sets each including the ribs 242 running perpendicularly to the central ribs 239. As shown more clearly in Fig. 10 the tops of ribs 239 are made of slightly convex shape indicated by the dash lines 241. The side ribs 242 also provide a generally concave cushioning portion 243, but can include upstanding post portions 244. Some or all of the cushioning ribs can also be interconnected as by means of the stiffening ribs 246.

The side panels 231, 232 are shown as also having cushioning ribs 251, 252 and 253 shaped to suitably engage and cushion corresponding portions of the article to be packaged. The construction of Figs. 9, 10 and 11 is shaped to snugly engage and cushion an article such as a household electric bread toaster 240 having a generally rectangular shape but with a flat bottom 262 and rounded sides 263, 264. In use two pads 229 are placed with the side panels 231 adjacent each other and a toaster is placed upon these adjoining panels with its long axis extending parallel to the hinges. The central panels 230 of each pad can then be folded up against the sides of the toaster and the side panels 232 folded down against the top. The toaster so cushioned can then be inserted in a holder such as the box 270. The toaster will then be securely packaged and will withstand an inordinate amount of rough handling.

In this construction the adjacent panels are arranged to abut each other as shown in Fig. 12. Furthermore the cushioning recesses in the central panels for example will provide all the desired article-positioning characteristics although these recesses are merely concavities that are free of any abrupt positioning deformations.

Figs. 14 to 18 inclusive show another form of cushioning pad that can be used to package generally rectangular articles such as a clock. Here the pad referred to as 329 has a central generally rectangular rib panel 330 with side panels 331, 332, 333 and 334 hinged to its four edges. The side panels are also ribbed, the ribs of the respective panels being arranged to abut each other when the side panels are arranged in the packaged position as shown in Figs. 17 and 18.

With this construction two pads are used for packaging each article, the pads being first placed in a suitable box 370 and folded into position with one pair of side panels left unfolded. The article can then be introduced through the passageway provided by the unfolded panels after which these panels are folded down to hold the articles in place. The box can then be closed to provide a very effective cushioning package. If desired the article can first be wrapped within two suitably folded pads and the combination inserted into a package container.

Figs. 19 to 23 inclusive show a modified construction in which a pad 429 is used for packaging as an equivalent for the pad 29 of Fig. 1. Pad 429 has a similar arrangement of panels 430, 431 and 432 ribbed in a manner that is also generally similar to the construction of Fig. 1. Although there are some differences between the specific configurations of the ribs, as well as the presence and location of the stiffening ribs, the cushioning ribs are all recessed and the cushioning action is very similar to that of the construction of Fig. 1.

According to the present invention it is not necessary that all of the cushioning ribs or even that all of the panels have projections that engage the sides of an object to keep it from shifting. In fact these projections can be limited to only those sides of the central panel that do not have other panels hinged to them.

As many apparently widely different embodiments of this invention may be made without departing from the spirit and scope hereof, it is to be understood that the invention is not limited to the specific embodiments hereof except as defined in the appended claims.

What is claimed:

1. A molded pulp packing device comprising a substantially flat sheet divided into a plurality of panels hingedly connected to each other, a stepped rib extending upwardly from the face of each panel, each stepped rib comprising a relatively low horizontal supporting surface and a lateral supporting surface extending upwardly from said horizontal supporting surface, said horizontal supporting surface forming a first cushioning surface adapted to resiliently support a packaged article in one plane and said lateral supporting surface forming a second cushioning surface in a second plane which is substantially perpendicular to the plane of said horizontal supporting surface and adapted to resiliently support said article in said second plane, said panels being each adapted to be hingedly folded into substantially perpendicular positions relative to each adjacent panel to provide double-surface peripheral support for the article.

2. The packing device of claim 1 wherein one portion of the stepped rib on each panel is constructed to abut the corresponding portion of the stepped rib on the adjacent panel when said panels are hingedly moved into perpendicular relationship to each other.

3. A package comprising a carton, a packing device within said carton, said packing device comprising a substantially flat sheet divided into a plurality of panels hingedly connected to each other, a stepped rib extending upwardly from the face of each panel, each stepped rib comprising a relatively low horizontal supporting surface and a lateral supporting surface extending upwardly from said horizontal supporting surface, said horizontal supporting surface forming a first cushioning surface adapted to resiliently support a packaged article in one plane and said horizontal supporting surface forming a second cushioning surface in a second plane which is substantially perpendicular to the plane of said horizontal supporting surface and adapted to resiliently support said article in said second plane, said panels being each hingedly folded into substantially perpendicular positions relative to each adjacent panel to form a peripheral support, and an article within the confines of said hingedly folded panels, one peripheral surface of said article being resiliently supported by the shorter rib portions on the panels and a second peripheral surface of said article being resiliently supported by the longer rib portions on the panels.

References Cited in the file of this patent

UNITED STATES PATENTS

| | | |
|---|---|---|
| D. 145,985 | Shepard | Nov. 26, 1946 |
| 2,217,455 | Price | Oct. 8, 1940 |
| 2,231,981 | Zalkind | Feb. 18, 1941 |
| 2,699,865 | Bowen | Jan. 18, 1955 |
| 2,758,772 | Williams | Aug. 14, 1956 |

FOREIGN PATENTS

| | | |
|---|---|---|
| 107,817 | Sweden | June 29, 1943 |